United States Patent
Park et al.

(10) Patent No.: US 8,228,845 B2
(45) Date of Patent: Jul. 24, 2012

(54) SENSOR NODE OF LOW POWER FOR MONITORING APPLICATION IN MESH SENSOR NETWORK USING TIME DIVISION ACCESS SCHEME, AND ROUTING METHOD THEREOF

(75) Inventors: Noseong Park, Daejeon (KR); Yoonmee Doh, Daejeon (KR); Jong-Arm Jun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 368 days.

(21) Appl. No.: 12/534,240

(22) Filed: Aug. 3, 2009

(65) Prior Publication Data

US 2010/0135262 A1    Jun. 3, 2010

(30) Foreign Application Priority Data

Dec. 3, 2008    (KR) .................. 10-2008-0121695

(51) Int. Cl.
*H04W 4/00* (2009.01)
(52) U.S. Cl. ......................................... 370/328; 370/338
(58) Field of Classification Search .................... 370/328
See application file for complete search history.

(56) References Cited

U.S. PATENT DOCUMENTS

| 5,893,081 | A | * | 4/1999 | Poppen | 705/400 |
| 6,016,485 | A | * | 1/2000 | Amakawa et al. | 705/400 |
| 2003/0179756 | A1 | * | 9/2003 | Cain | 370/395.42 |
| 2004/0032847 | A1 | * | 2/2004 | Cain | 370/338 |
| 2005/0030968 | A1 | * | 2/2005 | Rich et al. | 370/449 |
| 2006/0203795 | A1 | * | 9/2006 | Welborn et al. | 370/345 |
| 2008/0068996 | A1 | * | 3/2008 | Clave et al. | 370/230.1 |
| 2008/0075009 | A1 | * | 3/2008 | Picard | 370/238 |
| 2008/0165761 | A1 | * | 7/2008 | Goppner et al. | 370/350 |

FOREIGN PATENT DOCUMENTS

| JP | 2008-060934 | 3/2008 |
| KR | 10-2008-0086770 A | 9/2008 |

* cited by examiner

*Primary Examiner* — Kenny Lin
*Assistant Examiner* — Gerald Smarth
(74) *Attorney, Agent, or Firm* — Kile Park Goekjian Reed & McManus PLLC

(57) ABSTRACT

Provided are a sensor node of a low power for a monitoring application in a mesh sensor network using a time division access scheme, and a routing method thereof. The routing method of the sensor node may include: transmitting a beacon containing routing information to neighboring nodes in a first time slot within a first beacon interval that is allocated to the sensor node; and receiving a beacon from each of the neighboring nodes in a second time slot within a second beacon interval that is allocated to each of the neighboring nodes.

12 Claims, 7 Drawing Sheets

SENSOR NODE OF LOW POWER FOR MONITORING APPLICATION IN MESH SENSOR NETWORK USING TIME DIVISION ACCESS SCHEME, AND ROUTING METHOD THEREOF

CROSS-REFERENCE TO RELATED APPLICATION

This application claims the benefit of Korean Patent Application No. 10-2008-0121695, filed on Dec. 3, 2008, in the Korean Intellectual Property Office, the disclosure of which is incorporated herein by reference.

BACKGROUND

1. Field of the Invention

The present invention relates to a sensor node of a low power for a monitoring application in a mesh sensor network using a time division access scheme, and a routing method thereof. More particularly, the present invention relates to a sensor node that may decrease a power consumption and enhance a reliability using a routing function using a beacon, a neighboring node tracing function, and a beacon removal function, and a routing method thereof.

2. Description of the Related Art

Generally, a sensor node constituting a sensor network may operate by a battery. In order to maximize a battery lifetime, a battery consumption may need to decrease by lowering a duty cycle. One of schemes to lower the duty cycle may be a time division access scheme of allocating a time slot for each sensor node such as an Institute of Electrical and Electronics Engineers (IEEE) 802.15.4 standard. However, in the pure time division access scheme, the sensor node may need to be awakened every time slot of all the neighboring nodes in order to support a mesh. Therefore, a great amount of power may be consumed.

Figure 1:
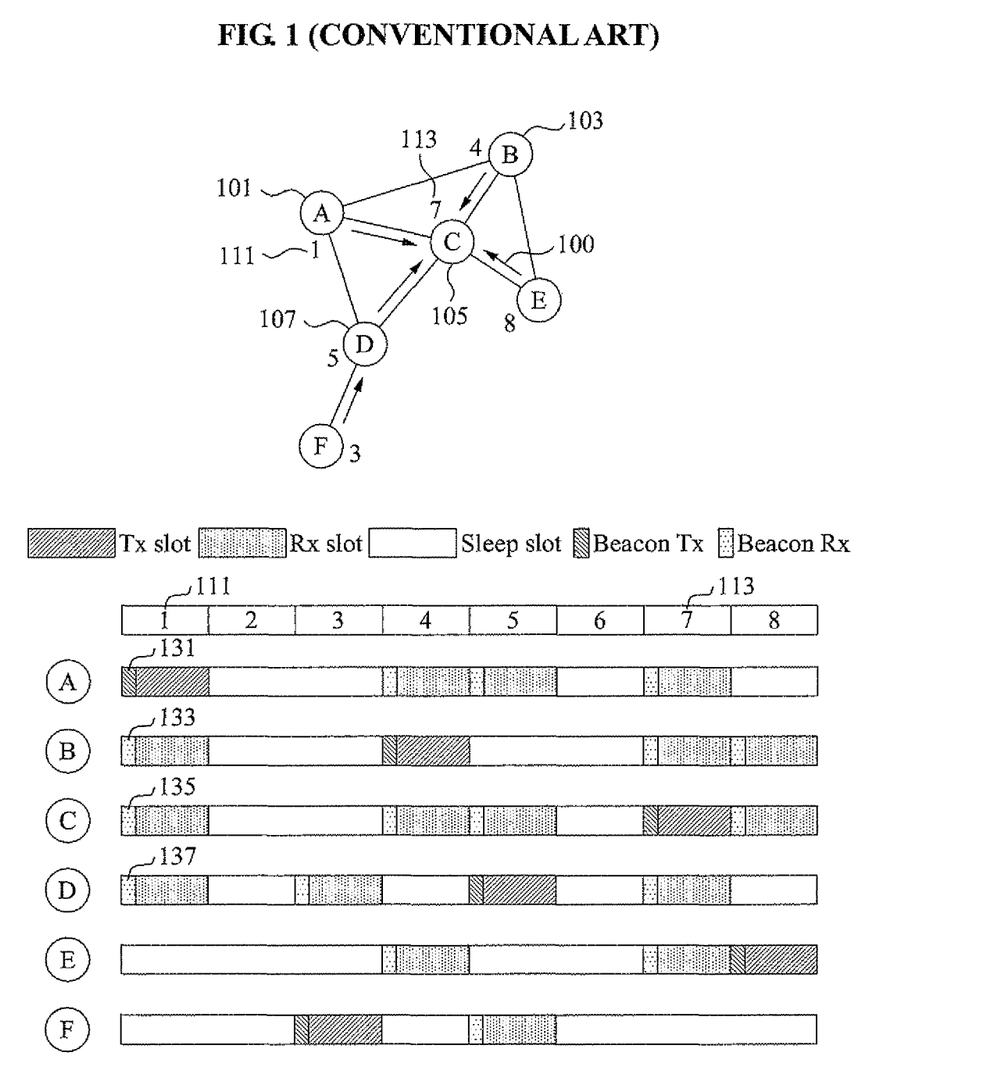
FIG. 1 illustrates a general operation example of a time division access Media Access Control (MAC) protocol.

FIG. 1 illustrates a general operation example of a time division access Media Access Control (MAC) protocol.

Referring to FIG. 1, a network includes six sensor nodes, for example, a first sensor node A 101, a second sensor node B 103, a third sensor node C 105, a fourth sensor node D 107, a fifth sensor node E, and a sixth sensor node F. An arrow indicator 100 denotes a routing path. Here, the network indicates a monitoring application where all the packets gather in the third sensor node C 105. A single time slot may be allocated to each sensor node. Each sensor node may transmit and receive a beacon and data in the allocated time slot. Neighboring nodes may receive the beacon and data in the allocated time slot. For example, a time slot (1) 111 may be allocated to the first sensor node A 101, and a time slot (7) 113 may be allocated to the third sensor node C 105. Therefore, the first sensor node A 101 may transmit a beacon and data in the allocated time slot (1) 111. Neighboring nodes may simplify receive the beacon and the data in the time slot (1) 111.

In the above mesh network, each sensor node may need to be awakened every time slot of all the neighboring nodes. For example, when the first sensor node A 101 broadcasts a beacon 131 in the allocated time slot (1) 111, neighboring nodes of the first sensor node A 101, that is, the second sensor node B 103, the third sensor node C 105, and the fourth sensor node 1) 107 may be awakened in the time slot (1) 111 and receive beacons 133, 135, and 137, respectively, and may prepare to receive data of the first sensor node A 101.

Accordingly, there is a need for a sensor node of a low power for a monitoring application that may be awakened only in a time slot of a necessary neighboring node to thereby decrease a power consumption in a mesh sensor network using a time division access scheme, and a routing method thereof.

SUMMARY

An aspect of the present invention provides a sensor node that may decrease a power consumption and enhance a reliability using a routing function using a beacon, a neighboring node tracking function, and a beacon removal function, and a routing method thereof.

According to an aspect of the present invention, there is provided a sensor node of a low power for a monitoring application in a mesh sensor network using a time division access scheme, the sensor node including: a transmitter to transmit a beacon containing routing information to neighboring nodes in a first time slot within a first beacon interval that is allocated to the sensor node; and a receiver to receive a beacon from each of the neighboring nodes in a second time slot within a second beacon interval that is allocated to each of the neighboring nodes.

According to another aspect of the present invention, there is provided a routing method of a sensor node of a low power for a monitoring application in a mesh sensor network using a time division access scheme, the method including: transmitting a beacon containing routing information to neighboring nodes in a first time slot within a first beacon interval that is allocated to the sensor node; and receiving a beacon from each of the neighboring nodes in a second time slot within a second beacon interval that is allocated to each of the neighboring nodes.

Additional aspects, features, and/or advantages of the invention will be set forth in part in the description which follows and, in part, will be apparent from the description, or may be learned by practice of the invention.

EFFECT

According to embodiments of the present invention, there may be provided a sensor node that may decrease a power consumption and enhance a reliability using a routing function using a beacon, a neighboring node tracking function, and a beacon removal function, and a routing method thereof.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout Exemplary embodiments are described below to explain the present invention by referring to the figures.

Hereinafter, a sensor node of a low power for a monitoring application in a mesh sensor network using a time division access scheme and a routing method thereof according to an embodiment of the present invention will be described in detail with reference to the accompanying drawings. Here, each sensor node may transmit a beacon and data only in a time slot allocated to the sensor node, based on the dime division access scheme. Neighboring nodes may receive a beacon and data in the allocated time slot.

Figure 2:
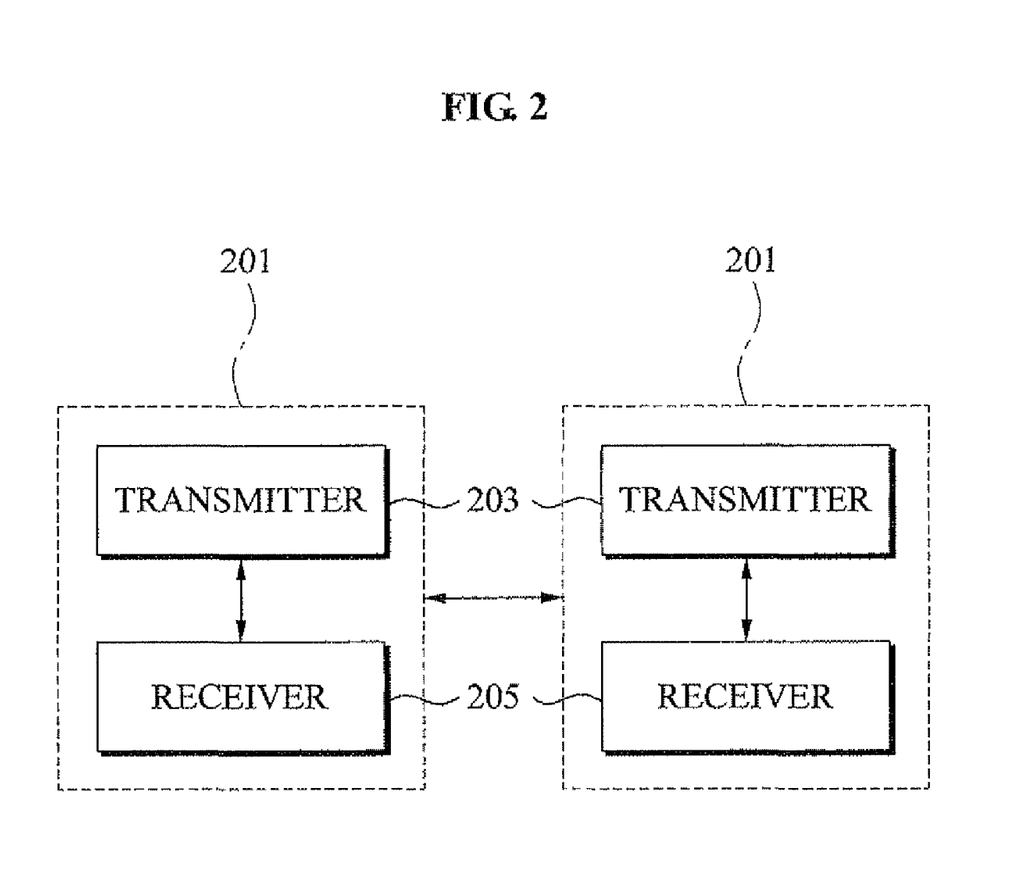
FIG. 2 is a block diagram illustrating a configuration of a sensor node of a low power for a monitoring application in a mesh sensor network using a time division access scheme according to an embodiment of the present invention.

FIG. 2 is a block diagram illustrating a configuration of a sensor node 201 of a low power for a monitoring application in a mesh sensor network using a time division access scheme according to an embodiment of the present invention.

Referring to FIG. 2, the sensor node 201 may include a transmitter 203 and a receiver 205.

The transmitter 203 may transmit a beacon containing routing information to neighboring nodes in a first time slot within a first beacon interval that is allocated to the sensor node 201.

Specifically, the transmitter 203 may transmit a beacon in a time slot that is allocated to the sensor node 201, every beacon interval, and may transmit, to the neighboring nodes, the beacon containing routing information every routing interval. Here, the routing interval may include a plurality of beacon intervals.

Figure 3:
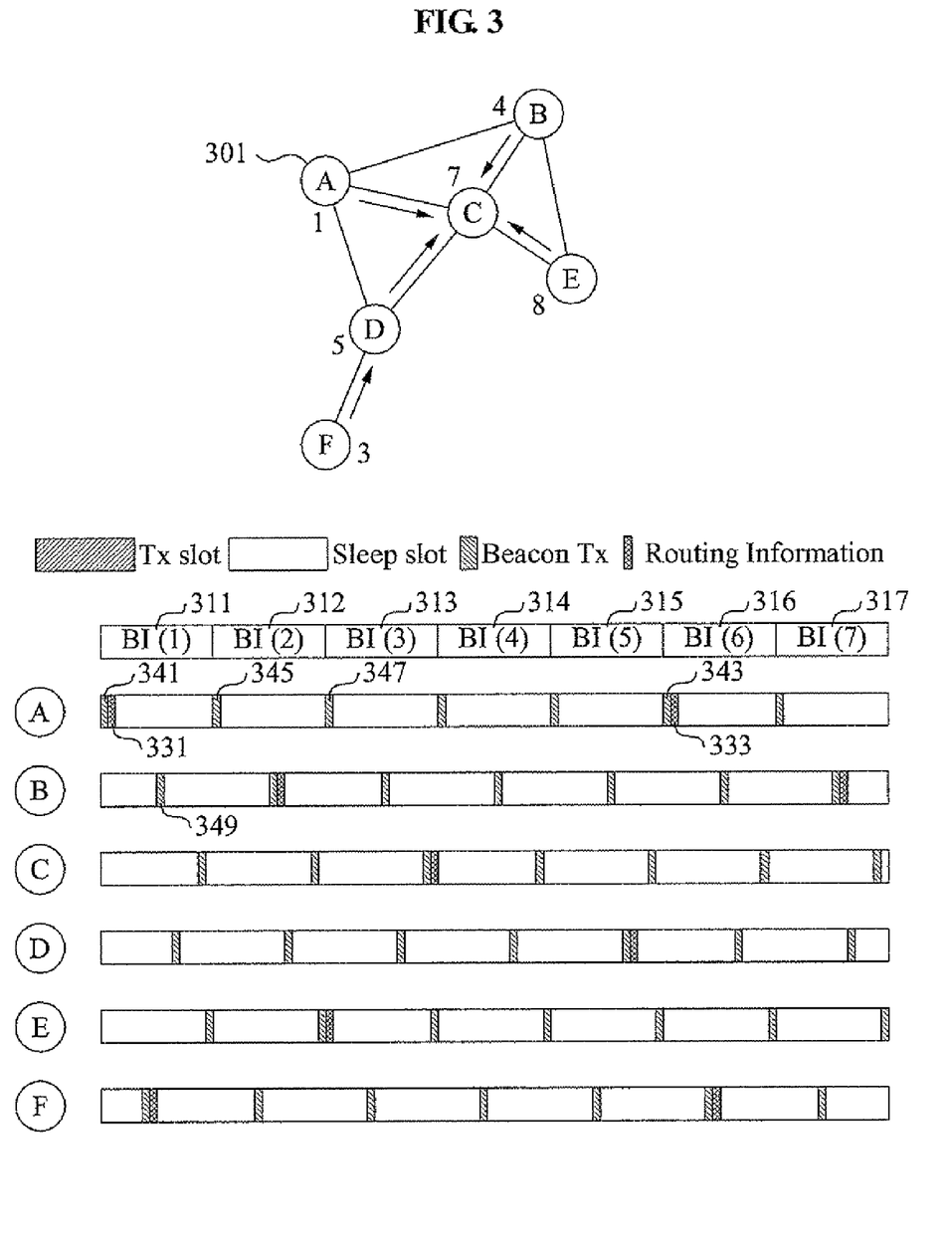
FIG. 3 is a diagram for describing a routing function using a beacon, included in a sensor node of a low power for a monitoring application in a mesh sensor network using a time division access scheme according to an embodiment of the present invention.

For example, as shown in FIG. 3, each sensor node may transmit a beacon to neighboring nodes periodically at each of beacon intervals (1, 2, 3, 4, 5, 6, 7) 311, 312, 313, 314, 315, 316, and 317. In this instance, a single beacon interval may include a plurality of time slots, for example, eight time slots.

Also, each sensor node may transmit a beacon containing routing information. In this instance, a starting point in time for transmitting the routing information and an interval thereof may be different for each sensor node. The starting point in time and the interval may be adjusted to be the same for each sensor node using a time synchronization.

For example, a first sensor node A 301 may transmit a beacon 341 containing routing information 333 in the beacon interval (1) 311 and then transmit a beacon 343 containing routing information 333 in the beacon interval (6) 316. A routing interval of the first sensor node A 311 may include five beacon intervals. Also, other sensor nodes B, C, D, E, and F may periodically transmit a beacon containing routing information according to a corresponding routing interval.

Hereinafter, a structure of a beacon containing routing information will be described with reference to FIG. 4.

Figure 4:
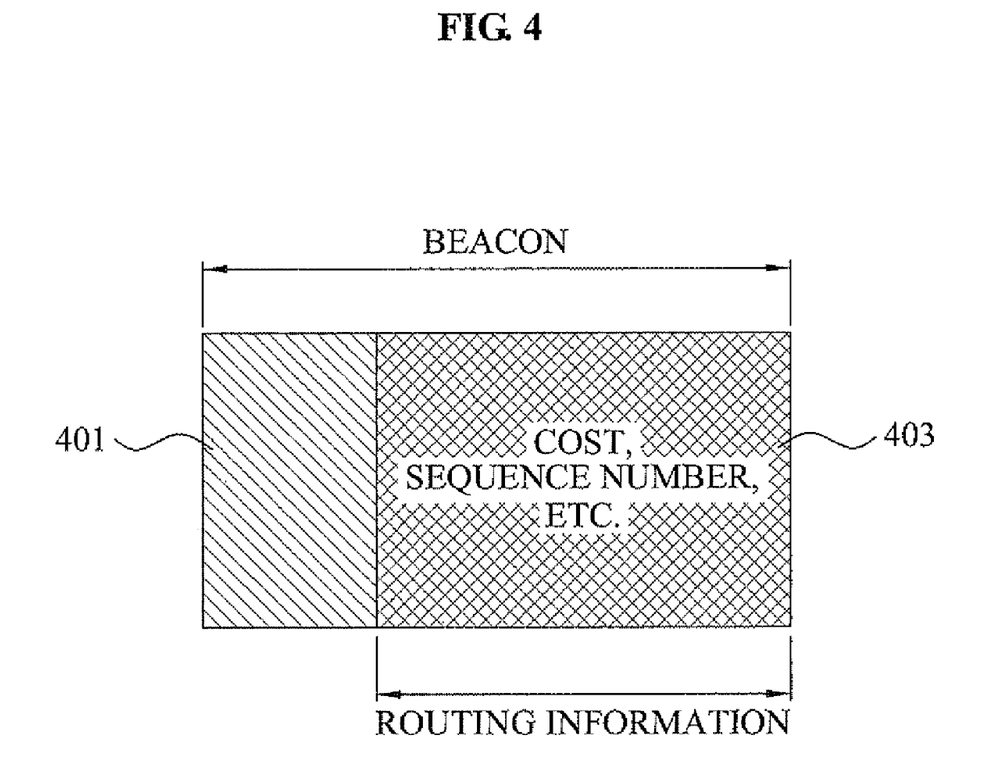
FIG. 4 is a diagram illustrating a structure of a beacon containing routing information according to an embodiment of the present invention.

Referring to FIG. 4, the beacon may include a header 401 and a payload portion 403. Routing information may be included in the payload portion 403. The routing information may be in a simple structure that include only a routing cost and a sequence number. Also, the routing information may be in a complex structure such as a Route Request (RREQ) used for Many-to-One Routing of ZigBee. The routing cost may be continuously accumulated while being spread from a sync node to other sensor nodes, and indicates a cost value to the sync node. The sequence number increases by one every time the sync node broadcasts new routing information and thus may be used to identify latest routing information.

When a beacon containing routing information is not transmitted in a previous beacon interval the receiver 205 may perform a normal neighboring node tracking. Specifically, the receiver 205 may receive only a beacon, transmitted from a sensor node connected on a routing topology, in a time slot allocated to the sensor node, instead of receiving a beacon from all the neighboring nodes. Therefore, the receiver 205 may be awakened in a second time slot allocated to a parent node on the topology to receive data that the parent node downwardly transmits on the topology, and may be awakened in a third time slot allocated to a child node to receive data that the child node upwardly transmits on the topology. When a beacon including an address of a new parent node is received from the child node, the receiver 205 may not receive data from the child node from a subsequent beacon interval.

The receiver 205 may be aware of a cost value to a sync node using a routing cost of routing information included in the beacon. Also, the receiver 205 may determine whether the routing information is latest routing information using a sequence number of the routing information. When the received routing information includes a previous sequence number, the routing information corresponds to past data and thus may be ignored.

Figure 5:
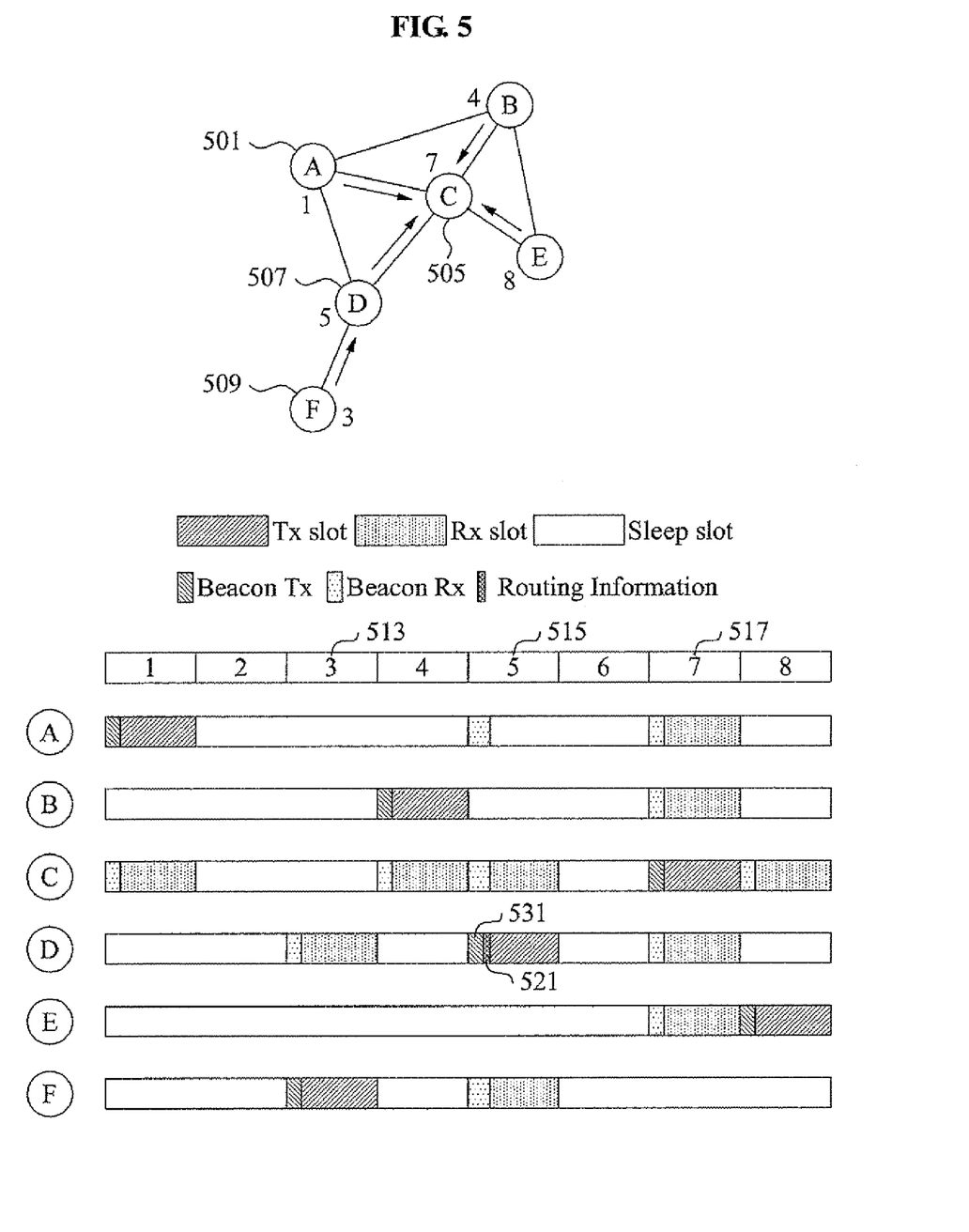
FIG. 5 is a diagram for describing a neighboring node tracking function of a sensor node according to an embodiment of the present invention.

Hereinafter, a normal neighboring node tracking will be described with reference to FIG. 5. FIG. 5 illustrates the beacon interval (5) 315 of FIG. 3 in detail.

Referring to FIG. 5, a fourth sensor node D 507 is connected to a third sensor node C 505 corresponding to a parent node and a sixth sensor node F 509 corresponding to a child node on a routing topology. In this instance, as a beacon containing routing information is not transmitted in a previous beacon interval of the beacon interval (5) 315, that is, in the beacon interval (4) 314, the fourth sensor node D 507 may perform the normal neighboring node tracking in the corresponding beacon interval (5) 305. Therefore, the fourth sensor node D 507 may not be awakened in a time slot allocated to another neighboring node. The fourth sensor node D 507 may be awakened in a time slot (7) 517, allocated to the third sensor node C 505 corresponding to the parent node, and may prepare to receive data. Also, the fourth sensor node D 507 may be awakened in a time slot (3) 513, allocated to the sixth sensor node F 509 corresponding to the child node, and may prepare to receive data.

When a beacon containing routing information is received from any one sensor node among neighboring nodes, and in this instance, a routing cost to an existing parent node is greater than a routing cost to a sensor node, the receiver 205 may select the sensor node as a new parent node. Next, the transmitter 203 may transmit a beacon including an address of the new parent node.

For example, as shown in FIG. 5, the parent node of the first sensor node A 501 is the third sensor node C 505 connected on the routing topology. In this instance, the first sensor node A 501 may communicate with the fourth sensor node D 507 but is not connected on a routing topology. Therefore, the first sensor node A 501 may have no need to be awakened. However, the first sensor node A 501 may be awakened in a time slot (5) 515 in order to receive routing information and thereby may receive only a beacon 531 containing routing information 521 of the fourth sensor node D 507 and then immediately enter a sleep mode. Here, since routing information is periodically broadcast from the fourth sensor node D 507, the first sensor node A 501 may accurately know when the four sensor node D 507 may broadcast subsequent routing information.

In this case, when a routing cost to the existing parent node, that is, the third sensor node C 505 is greater than the routing cost to the fourth sensor node D 507, the first sensor node A 501 may select the fourth sensor node D 507 as a new parent node. Next, the first sensor node A 501 may transmit a beacon including an address of the fourth sensor node D 507 that is a new parent node in the beacon interval (6) 316 of FIG. 3. Specifically, the first sensor node 501 may transmit a beacon 621 including the address of the fourth sensor node 1) 507 as shown in FIG. 6 regarding the beacon interval (6) 316.

Conversely, when a beacon containing routing information is transmitted in the previous beacon interval, the receiver 205 may track all the neighboring nodes in order to verify whether there is a neighboring node that selects the sensor node 201 as a new parent node on a topology. Specifically when the beacon containing the routing information is transmitted in the previous beacon interval, the receiver 205 may receive a beacon in a time slot that is allocated to each of the neighboring nodes.

Hereinafter, a neighboring node tracking function of a sensor node to verify whether there is a neighboring node that selects the sensor node as a new parent node will be described with reference to FIG. 6. FIG. 6 illustrates the beacon interval (6) of FIG. 3 in detail.

Figure 6:
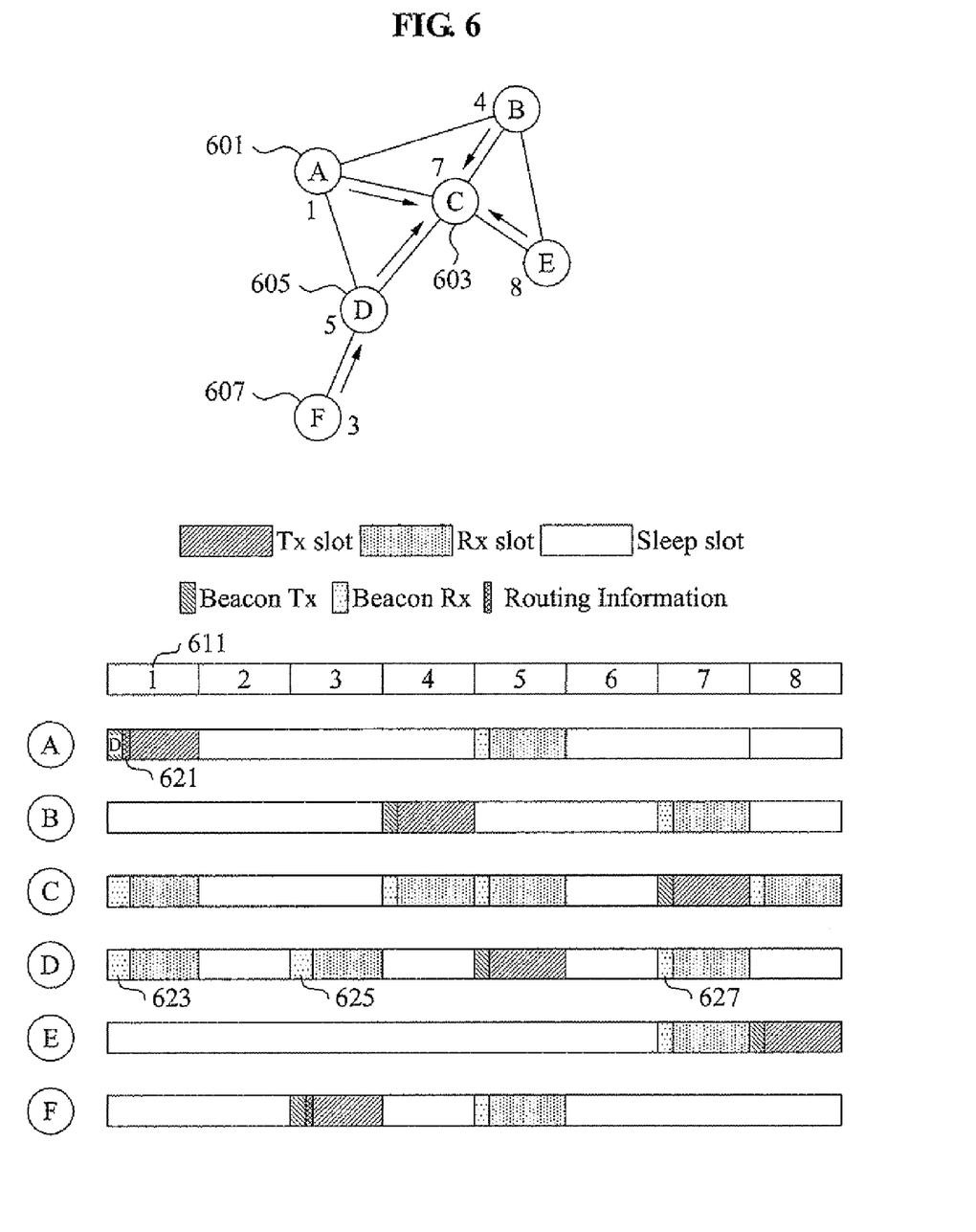
FIG. 6 is a diagram for describing a neighboring node tracking function of a sensor node to verify a changed topology after the sensor node transmits routing information according to an embodiment of the present invention.

Referring to FIG. 6, as a beacon containing routing information is transmitted in a previous beacon interval of the beacon interval (6) 316, that is, the beacon interval (5) 315, a fourth sensor node D 605 may track neighboring nodes to verify whether there is a neighboring node that selects the fourth sensor node D 605 as a new parent node. Therefore, although the fourth sensor node D 605 is not connected to a first sensor node A 601 on a routing topology until the beacon interval (5) 315, the fourth sensor node D 605 may be awakened in a time slot (1) 611 of the first sensor node A 601 to receive a beacon 623. In this instance, the fourth sensor node D 605 may be aware of that the first sensor node A 601 selects the fourth sensor node D 605 as the new parent node, based on the beacon 623 received from the first sensor node A 601. Accordingly, from a subsequent beacon interval of the beacon interval (6) 316, that is, the beacon interval (7) 317, the fourth sensor node D 605 may be awakened every time slot (1) 611 that is allocated to the first sensor node 601, even in a normal neighboring node tracking, to thereby perform tracking.

As described above, immediately after routing information is broadcast, the fourth sensor node D 605 may be awakened in each time slot of all the neighboring nodes, that is, the first sensor node A 601, a third sensor node C 603, and a sixth sensor node F 607 to receive beacons 623, 625, and 627, to receive and verify whether there is a neighboring node that selects the fourth sensor node D 605 as a new parent node. In this instance, with respect to a verified neighboring node, the fourth sensor node D 605 may perform tracking according to a normal neighboring node tracking scheme. With respect to an unverified neighboring node, the fourth sensor node D 605 may further receive a beacon in a plurality of beacon intervals and try to perform a verification. When it continuously fails in a particular beacon interval, the fourth sensor node D 605 may delete a corresponding neighboring node from a neighboring node list.

The third sensor node C 603 is a parent node of the first sensor node A 601 in the previous beacon interval of the beacon interval (6) 316, that is, the beacon interval (5) 315, and thus may receive a beacon from the first sensor node A 601 in the corresponding beacon interval (6) 316. Next, the third sensor node C 603 may receive a beacon including an address of the new parent node from the first sensor node A 601. Therefore, from the subsequent beacon interval, that is, the beacon interval (7) 317, the third sensor node C 603 may have no need to be awakened in a time slot allocated to the first sensor node 601 corresponding to a child node.

Figure 7:
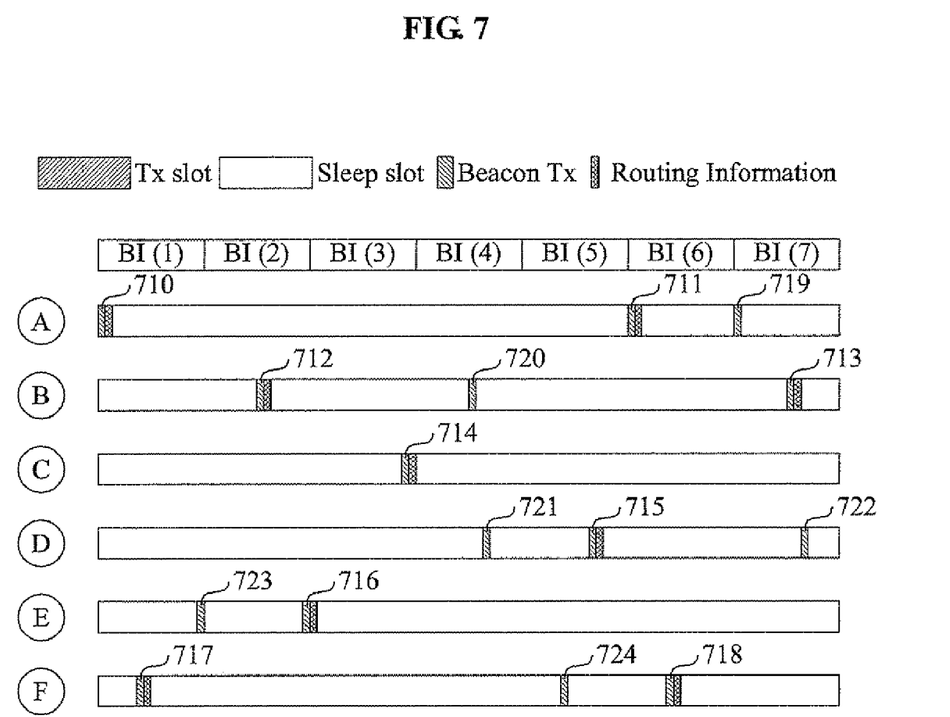
FIG. 7 is a diagram for describing a beacon removal function of a sensor node in a low power mode according to an embodiment of the present invention.

FIG. 7 is a diagram for describing a routing method of selectively removing a beacon in a low power mode according to an embodiment of the present invention.

Referring to FIGS. 2, 3, and 7, the transmitter 203 may selectively remove the beacon and thereby not transmit the beacon in the low power mode. Specifically, when a beacon does not include routing information, data to be transmitted, and a new parent node, the transmitter 203 may remove the beacon and thereby not transmit the beacon.

For example, each sensor node of FIG. 3 may remove beacons 345, 347, and 349 and thereby may not transmit the beacons 345, 347, and 349, whereas each sensor node of FIG. 7 may broadcast beacons 710, 711, 713, 714, 715, 716, and 718 in set intervals without removal thereof. Here, beacons 719, 720, 721, 722, 723, and 724 not containing routing information may be deleted, but may not be deleted depending on whether a corresponding beacon includes data to be transmitted. Also, a beacon including the new parent node may not be deleted. The beacon may be required when tracking neighboring nodes to verify whether there is a neighboring node that selects a corresponding sensor node as the new parent node.

When a beacon is not received in the low power mode, it may indicate that a sensor node allocated with a corresponding time slot has no data to transmit and thus may immediately enter a sleep mode.

Hereinafter, a routing method of a sensor node of a low power for a monitoring application in a mesh sensor network using a time division access scheme according to an embodiment of the present invention will be described.

Initially, a sensor node may communicate with neighboring nodes connected on a routing topology.

Specifically, the sensor node may broadcast a beacon in a time slot allocated to the sensor node, and may broadcast the beacon periodically every beacon interval including a plurality of time slots. Next, the sensor node may track neighboring nodes connected on the routing topology to thereby communicate with the neighboring nodes. Specifically, after broadcasting data in the allocated time slot, the sensor node may be awakened only in a time slot allocated to each of a parent node and a child node connected on the routing topology and thereby may receive data from the parent node and the child node.

When a beacon including an address of a new parent node is received from the child node, a connection on the routing topology may be disconnected from a subsequent beacon interval of a corresponding beacon interval, and thus the sensor node may have no need to be awakened in the time slot allocated to the child node. When the sensor node is changed to the new parent node, the sensor node may broadcast the beacon including the address of the new parent node in the time slot allocated to the sensor node.

Every routing interval including a plurality of beacon intervals, the sensor node may broadcast a beacon containing routing information.

Also, when the sensor node is not connected on a routing topology but a neighboring node transmits a beacon containing routing information, the sensor node may be awakened in a time slot allocated to the neighboring node to receive only the beacon containing the routing information and then immediately enter a sleep mode.

Next, when a beacon containing routing information is transmitted in a previous beacon interval, the sensor node may track all the neighboring nodes.

Specifically, in order to verify whether there is a neighboring node that selects the sensor node as a new parent node on a topology after transmitting routing information, the sensor node may be awakened in a time slot allocated to each of neighboring nodes, which re not connected on the routing topology, to receive data from the neighboring nodes.

The sensor node may selectively remove a beacon in the low power mode and thereby not transmit the beacon.

Specifically, when a beacon does not include routing information, data to be transmitted, and a new parent node, the sensor node may delete the beacon, and thereby not transmit the beacon. Also, when a beacon is not transmitted in the low power mode, it may indicate there is no data to be transmitted in a time slot allocated to the sensor node and thus the sensor node may immediately enter a sleep mode.

According to an embodiment of the present invention, in a mesh sensor network using a time division access, when a beacon containing routing information is transmitted, a sensor node of a low power for a monitoring application may track all the neighboring nodes. When the beacon containing the routing information is not received, the sensor node may track only neighboring nodes that are connected on a routing topology. Therefore, it is possible to decrease a power consumption and to effectively perform routing. When a beacon does not include routing information, data to be transmitted, and a new parent node, the sensor node may delete the beacon and thereby not transmit the beacon. Accordingly, it is possible to further decrease the power consumption.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A routing method of a sensor node using a time division access scheme, wherein the sensor node is associated with a plurality of neighboring nodes, the method comprising:
   transmitting a beacon to at least one of the neighboring nodes in a first time slot within a second beacon interval that is allocated to the sensor node;
   if a beacon comprising routing information is not received from any of the neighboring nodes in a first beacon interval occurring before the second beacon interval, then receiving a beacon in the second beacon interval only from each of the neighboring nodes that is connected to the sensor node by a routing topology; and
   if a beacon comprising routing information is received from at least one of the neighboring nodes in the first beacon interval, then receiving a beacon in the second beacon interval from each of the neighboring nodes.

2. The method of claim 1, wherein the transmitting a beacon comprises periodically transmitting a beacon comprising routing information to the at least one of the neighboring nodes every routing interval, and wherein a routing interval comprises a plurality of beacon intervals.

3. The method of claim 1, wherein the receiving a beacon in the second beacon interval only from each of the neighboring nodes that is connected to the sensor node by a routing topology comprises:
   receiving a beacon from at least one of a parent node or a child node connected to the sensor node by the routing topology, in a time slot within the second beacon interval that is allocated to the parent node, or in a time slot within the second beacon interval that is allocated to the child node.

4. The method of claim 1, further comprising:
   selecting, as a new parent node, a second sensor node among the neighboring nodes if a beacon comprising routing information is received from the second sensor node in the first beacon interval, and a routing cost to an existing parent node is greater than a routing cost to the second sensor node; and
   transmitting, to the second sensor node, a beacon comprising an address of the new parent node in the first time slot of the second beacon interval that is allocated to the sensor node.

5. The method of claim 1, wherein the transmitting a beacon comprises periodically transmitting a beacon to the at least one of the neighboring nodes every beacon interval, except if the beacon to be transmitted by the sensor node does not include routing information, data to be transmitted, and a new parent node address, then the beacon is not transmitted.

6. The method of claim 1, wherein the receiving a beacon in the second beacon interval from each of the neighboring nodes comprises:
   receiving a beacon from a second sensor node among the neighboring nodes that indicates that the sensor node is a new parent node of the second sensor node.

7. A sensor node using a time division access scheme, wherein the sensor node is associated with a plurality of neighboring nodes, the sensor node comprising:
   a transmitter to transmit a beacon to at least one of the neighboring nodes in a first time slot within a second beacon interval that is allocated to the sensor node; and
   a receiver, wherein:
      if the receiver does not receive a beacon comprising routing information from any of the neighboring nodes in a first beacon interval occurring before the second beacon interval, then the receiver receives a beacon in the second beacon interval only from each of the neighboring nodes that is connected to the sensor node by a routing topology; and
      if the receiver does receive a beacon comprising routing information from at least one of the neighboring nodes in the first beacon interval, then the receiver receives a beacon in the second beacon interval from each of the neighboring nodes.

8. The sensor node of claim 7, wherein the transmitter periodically transmits a beacon comprising routing information to the at least one of the neighboring nodes every routing interval, and wherein a routing interval comprises a plurality of beacon intervals.

9. The sensor node of claim 7, wherein, if the receiver does not receive a beacon comprising routing information from any of the neighboring nodes in the first beacon interval, then the receiver receives a beacon from at least one of a parent node or a child node connected to the sensor node by the routing topology, in a time slot within the second beacon interval that is allocated to the parent node, or in a time slot within the second beacon interval that is allocated to the child node.

10. The sensor node of claim 7, wherein, if a beacon comprising routing information is received from a second sensor node among the neighboring nodes in the first beacon interval, and a routing cost to an existing parent node is greater than a routing cost to the second sensor node, the transmitter selects the second sensor node as a new parent node, and transmits, to the second sensor node, a beacon comprising an address of the new parent node in the first time slot of the second beacon interval that is allocated to the sensor node.

11. The sensor node of claim 7, wherein the transmitter periodically transmits a beacon to the at least one of the neighboring nodes every beacon interval, except if the beacon to be transmitted does not include routing information, data to be transmitted, and a new parent node address, then the transmitter does not transmit the beacon.

12. The sensor node of claim 7, wherein, if the receiver does receive a beacon comprising routing information from at least one of the neighboring nodes in the first beacon interval, then the receiver receives a beacon in the second beacon interval from a second sensor node among the neighboring nodes that indicates that the sensor node is a new parent node of the second sensor node.

* * * * *